Aug. 31, 1948.  C. R. IRONS ET AL  2,448,433
MAKING WRINKLE-FREE FILM
Filed Sept. 10, 1945  3 Sheets-Sheet 1

INVENTORS
Carroll R. Irons
Charles E. Sanford
BY
Griswold & Burdick
ATTORNEYS

Aug. 31, 1948.  C. R. IRONS ET AL  2,448,433
MAKING WRINKLE-FREE FILM
Filed Sept. 10, 1945  3 Sheets-Sheet 2

INVENTORS
Carroll R. Irons
BY Charles E. Sanford
Griswold & Burdick
ATTORNEYS

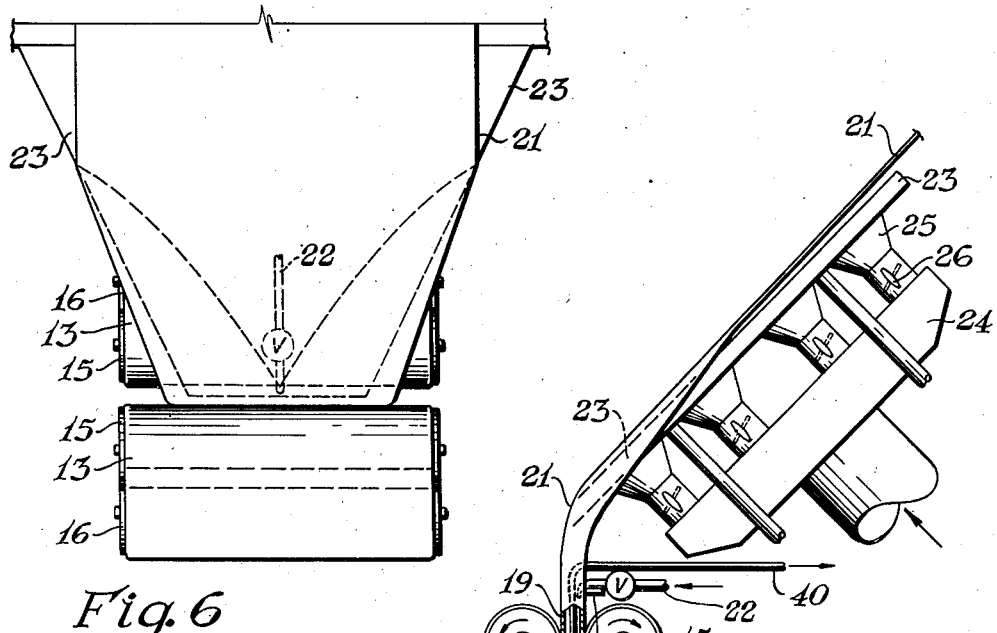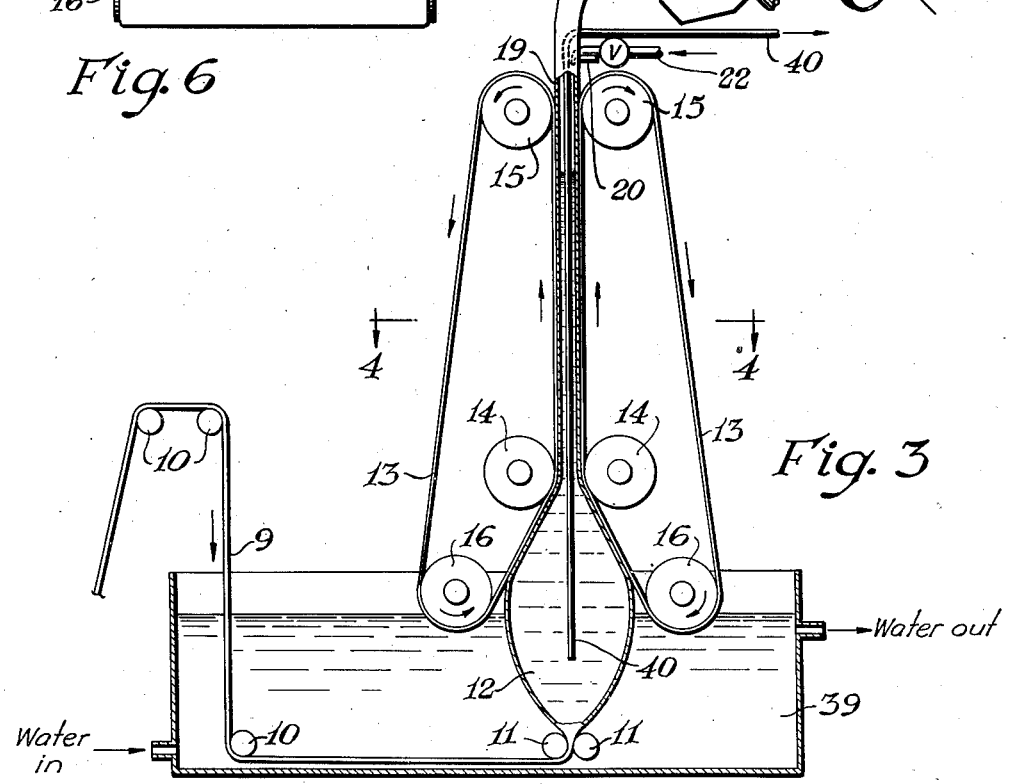

Patented Aug. 31, 1948

2,448,433

UNITED STATES PATENT OFFICE 2,448,433

MAKING WRINKLE-FREE FILM

Carroll R. Irons and Charles E. Sanford, Midland, Mich., assignors to The Dow Chemical Company, Midland, Mich., a corporation of Delaware Application September 10, 1945, Serial No. 615,276

9 Claims. (Cl. 18—47.5)

This invention relates to a method of making wrinkle- and crease-free films from normally crystalline copolymers of vinylidene chloride.

It is now well known that many copolymers of vinylidene chloride are crystalline, when examined by X-ray diffraction methods; that such copolymers may be fused to a non-crystalline condition at temperatures above their respective softening points; that the fused copolymers may be cooled rapidly to provide another non-crystalline form of the copolymer, known as the supercooled condition; and, that stretching of the supercooled material results in a recrystallization thereof, with the sub-microscopic crystallites aligned with their axes in the stretching plane. It is to films made from such a polymeric material that this invention relates.

It has also been recognized, in the plastic film art, that a most practical method of producing films and foils is to extrude the material in tubular form, expand the tube both radially and longitudinally, and finally to slit the tube to provide a thin film. It has been the practice to effect the radial and longitudinal expansion by entrapping a bubble of air in the extruded tube, by constricting the tube between two sets of pressure rollers. Alternatively, it has been proposed to effect the radial expansion by means of a confined column of water or other inert liquid, and to effect longitudinal stretching between two sets of pressure rollers. These methods are effective to produce thin tubing from relatively thicker extruded tube, but they have been attended by certain serious disadvantages, especially in the manufacture of film from normally crystalline vinylidene chloride copolymers. The use of the two sets of pressure rolls, mentioned above, to confine the fluid expansion agent, has resulted in the formation of laterally creased and wrinkled, flattened tubes. When these tubes are slit open to make a single film having a width equal to the circumference of the distended bubble used in their preparation, they have always exhibited a permanent distortion in the form of the said lateral creases and wrinkles. No amount of rolling or stretching of an oriented crystalline vinylidene chloride film has been found heretofore which will remove these deformities at ordinary temperatures, and attempts to employ smoothing operations at elevated temperatures have led to shrinkage, distortion, and loss of orientation, without removal of the wrinkles. Such creased and wrinkled tubes and films have required excessive trimming. The flattened tube has usually had to be cut along each edge, thus giving a final sheet only half the width actually produced.

It is accordingly an object of the present invention to provide a method for the production of wrinkle- and crease-free film from normally crystalline vinylidene chloride copolymers. It is a related object to provide such a method wherein the film is prepared by the concurrent radial and longitudinal distension of a tube of such a copolymer, supplied in the supercooled condition. A further object is to provide a method as aforesaid wherein a liquid distension medium is used and in which the distended tube is not flattened between pinch rolls. The general object is the provision of a method whereby substantially faultless film may be produced by extrusion and stretching of a normally crystalline vinylidene chloride copolymer. Other objects may appear hereinafter.

It has now been found that the foregoing and related objects may be attained by a method which comprises providing a tube of a normally crystalline vinylidene chloride polymer, in the supercooled condition, moving the tube vertically through pinch rolls or similar constriction means, while distending the same radially by means of a column of inert liquid confined therein, and stretching the liquid-filled tube longitudinally without again closing the tube, while the same is being moved vertically upward, meantime maintaining an open mouth at the upper (and substantially fully stretched and oriented) end of the tube, slitting the tube at said open mouth, spreading out the slit tube, and finally collecting the so-formed uncreased, wrinkle-free and essentially faultless film. Further details will be explained during and after a description of the process with reference to the annexed drawing, wherein:

Fig. 3 is an enlarged portion of Fig. 1, partially in section, showing more details of the film-forming operation;

Fig. 6 is an enlarged portion of Fig. 2, showing in plan the means for opening a stretched tube to form a sheet.

Figure 1:
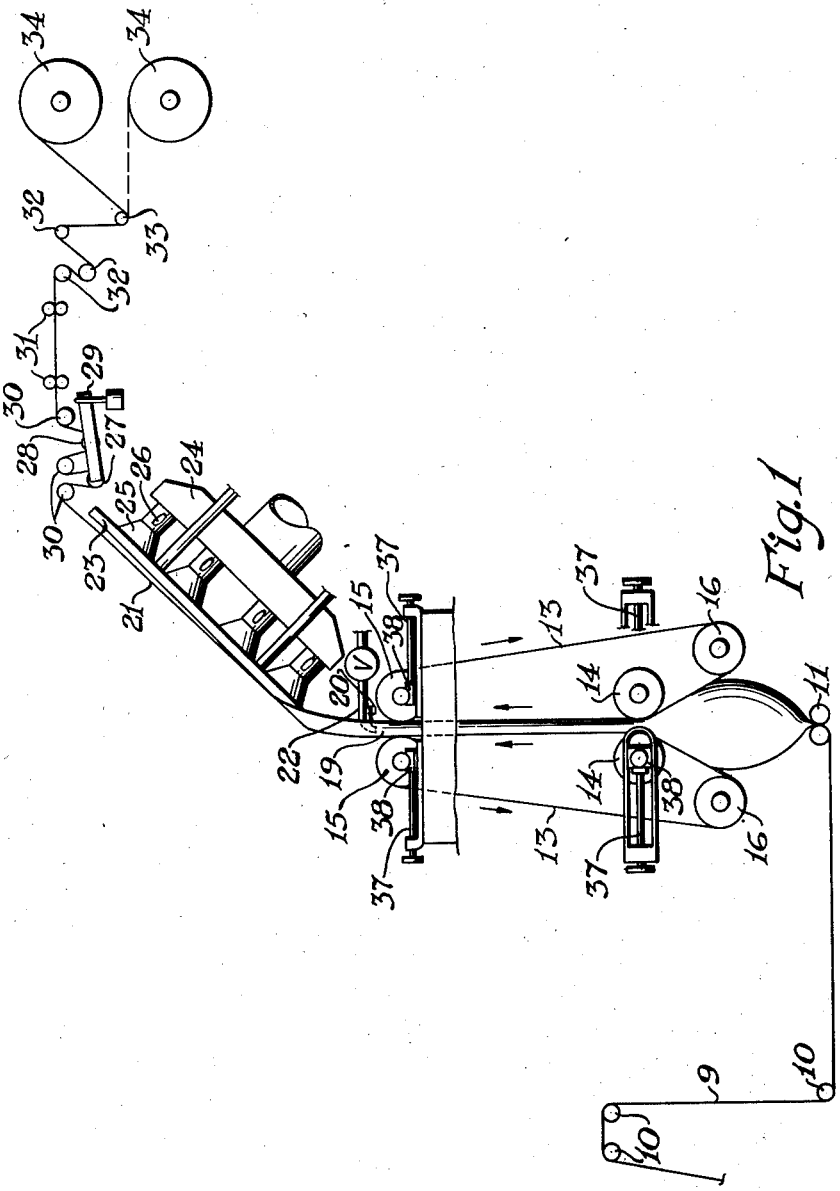
Fig. 1 is a partially diagrammatic side elevation of an apparatus for carrying out the method of the invention.

Referring now to the drawings, an extruded and supercooled tube 9 of normally crystalline vinylidene chloride polymer is conducted from the supercooling bath (not shown) over guide rolls 10 and between pinch rolls 11, which serve to close the tube at a fixed point in its path. Water 12, or other inert liquid, is fed into the supercooled tube as the latter is lifted vertically away from pinch rolls 11, until the weight of the water causes expansion of the tube 9, which is then led between a pair of co-operative endless belts 13. The belts 13 are driven in the direction shown, in their passage around rolls 14, 15 and 16, by means of motor 17 and gears 18 (shown in Fig. 2). After emerging from between belts 13, the stretched and crystallized tube 19 is slit by cutting means 20, to produce a film sheet 21. The cutting means 20 may suitably be mounted on water tube 22, which is disposed over the open mouth of tube 19 and from which water may be added, as desired, to the inventory 12 within the tube 19 above pinch rolls 11. Film sheet 21 is led over the end of a perforated or slotted spreader board 23, which opens the initially tubular sheet and lays it flat. Air is blown, from a source not shown, through a manifold 24 and outlets 25 which communicate with the outwardly directed slots in the spreader board, at a rate which is regulated by dampers 26, to free sheet 21 of wrinkles, and to provide it in a flat form as a feed to the smoothing and reeling mechanism. Film sheet 21 is kept under moderate tension as it traverses the smoothing mechanism, by means of float rolls 27 and 28 and adjustably weighted lever arm 29. The film 21 is forwarded by means of driven rolls 30, and is drawn through idler rolls 31 and over tension rolls 32 by means of driven roll 33 and reel 34, the latter being driven as by motor 35a. Operation is continuous, and quick transition may be made from one film reel 34 to another by simple raising or lowering, as appropriate, of adapter 35 (shown in Fig 2) which is pivotally mounted near roll 33 and which carries the film in a smooth, wrinkle-free condition from roll 33, between edge-gripping or tentering rolls 36, to reel 34.

It is noted that, after the supercooled tube 9 passes pinch rolls 11, it is immediately inflated with water or other inert liquid 12, and thereafter the stretched tube 19 is not again pinched shut between rollers. There are accordingly none of the objectionable lateral creases which have characterized films heretofore prepared by the inflation of such a tube between two sets of pinch rolls.

The water-filled, stretched tube 19 is lifted vertically from pinch rolls 11 solely by the action of belts 13. Driven rolls 30 and 33, in the take-up section of the apparatus, serve only to advance the smoothed film, while float rolls 27 and 28 remove any slack in the film, to prevent wrinkling due to any fluctuation in its rate of supply. The lifting power of belts 13, due to their frictional engagement with water-filled tube 19, is adequate to lift that tube and to draw the newly stretched tube continuously from the point of stretching adjacent pinch rolls 11. Since no stretching can occur until the fiber stress of the supercooled tube is exceeded by the stretching forces, transverse stretching is assured by adjusting the height of the column of contained liquid. This is controlled easily by variation of the distance between the parallel belts 13. Such variation may be effected by tightening or loosening tension screws 37 which operate to move bearings 38 and their associated rolls, and hence belts 13, closer together or further apart, as desired.

Figure 4:
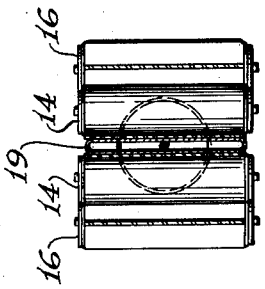
Fig. 4 is a section, taken along line 4—4 of Fig. 3.

As the tube emerges from the bite of rolls 11 and is first expanded by the force of the water column, the bubble is of circular cross-section, but as the filled tube 19 is seized and conveyed upward by and between belts 13, it is deformed and compressed to the somewhat flattened oval cross-section shown, for example, in Fig. 4. Thus, when a fully-stretched tube 19 has a diameter of 14 inches, a circumference of 44 inches and encloses a cross-sectional area of 154 square inches, the same tube may be deformed to a rectangular cross-section of 1 x 21 inches, with the same perimeter of 44 inches. Hence, using the same example, if such a cylindrical tube is filled to a unit height with water, and is then deformed in the indicated manner, the same volume of water will be 7.3 units in height, and the pressure per unit area at the bottom of the water column will be 7.3 times as great as the initial pressure, due to the hydrostatic paradox which allows high pressures to be attained with relatively small volumes of fluid. This gives an indication of the degree of control which may be exercised in the stretching of the water-filled tube as it emerges from pinch rolls 11.

The longitudinal stretching is effected in part by the head of water in the tube, but in large measure is the result of the action of belts 13 in lifting and conveying water-filled tube 19 vertically away from pinch rolls 11. The amount of longitudinal stretching may be varied by regulation of the ratio of the linear speed of belts 13 to the rate of supply of supercooled tube 9 to the system. The ratio between longitudinal and transverse stretching is thus seen to be variable by adjustment of belts 13 as to their spacing and speed.

In a specific example, a normally crystalline copolymer of about 85 per cent vinylidene chloride and about 15 per cent of vinyl chloride was plasticized with 7 per cent of its weight of di-(alpha-phenylethyl)ether, and was extruded in tubular form, at 173° C., and at a rate of 20 linear feet per minute into a cold water bath maintained at 3° C. The supercooled tube so produced was 4 inches in diameter and had a wall thickness of about 12 mils. It was conveyed from the bath through pinch rolls 11 and was filled with water at 25° C. The resulting tube was fed between belts 13, each 18 inches wide, spaced apart 2 inches. The height of the water column was adjusted to 40 inches. The water-filled tube below belts 13 attained a maximum diameter of 12 inches, showing threefold distension of the original tube. The portion of the tube under deformation between belts 13 was 30 inches long and was compressed to have a flattened oval cross-section about 17 inches along the major axis and 2 inches along the minor axis. The belts were driven at a linear rate of about 60 feet per minute, effecting a longitudinal stretch to about 3 times the initial length of a unit weight of supercooled tube. The so-stretched and crystallized tube was split and spread open around a slotted isosceles trapezoidal spreader board which was 48 inches wide at its base, 13 inches at its apex, and 40 inches long, and through the outwardly directed slots of which air was blown from beneath toward the edges of the board, billowing the film out into a wrinkle-free flat sheet 38 inches wide, which was then conveyed through the smoothing and reeling means previously described, at a rate to prevent accumulation of slack but insufficient to impart any added tension to the tube being stretched and lifted by and between the opposed endless belts. The resulting film was smooth and wrinkle-free, and showed none of the faults heretofore present in films produced by distention of tubes between two sets of pinch rolls. It was about 1.3 mils thick.

Figure 2:
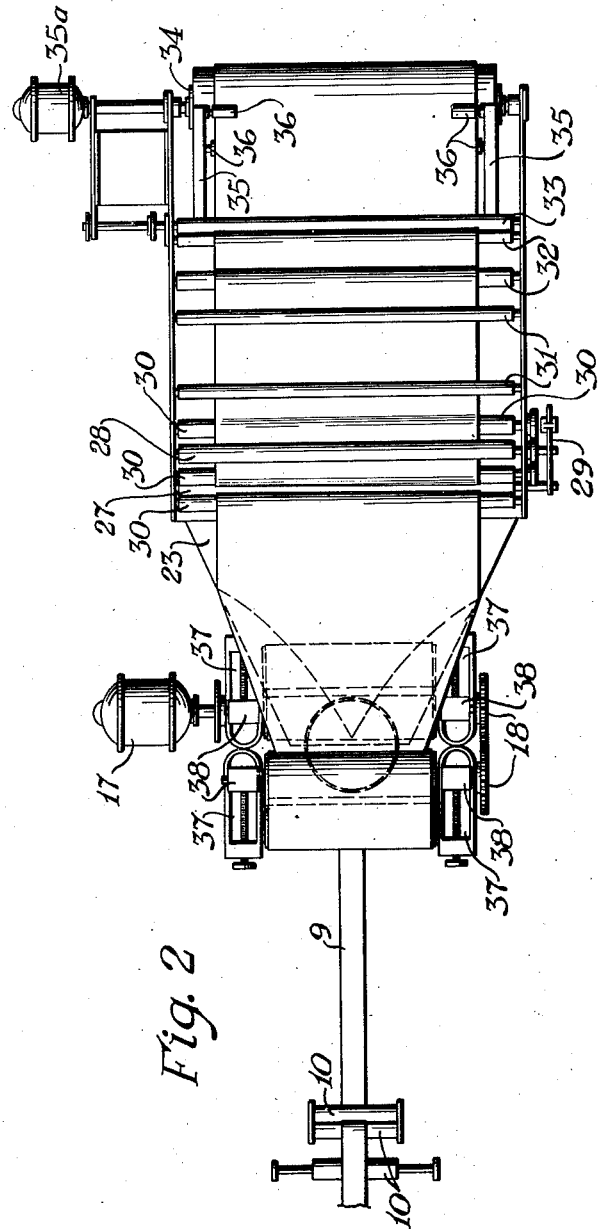
Fig. 2 is a plan view of the apparatus shown in Fig. 1.
Figure 5:
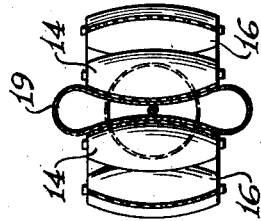
Fig. 5 is a similar sectional view, taken through another modification of the same type of apparatus.

Instead of the right cylindrical rollers and flat belts illustrated in Figs. 2, 4 and 6, there may be employed crowned rolls and conforming belts, as suggested in Fig. 5, in which case the deformed tube, in its passage between the opposed belts, will have a cross-section of dumbbell shape, as shown in Fig. 5. This modification of the apparatus avoids lateral crimping of the stretched tube under all conditions of operation. There is shown in Fig. 3 a means for effecting more complete control of the film stretching operation. It is known that crystalline vinylidene chloride polymers tend to crystallize from the non-crystalline, supercooled condition upon prolonged standing, or after shorter periods when warmed to temperatures above the temperature at which the article was supercooled. It is known, further, that stretching of these polymers results in a higher degree of crystallization, and is more easily carried out, if performed on the supercooled material after most of the crystallization induction period has passed. In the present process, it has been found advantageous to pass the oncoming supercooled tube 9 through a water bath 39, the temperature of which may be kept at any appropriate value to simplify the stretching operation. Bath 39 may conveniently be at a temperature between 25° and 40° C., for example. The same water bath 39 is of value, as well, in equalizing pressure around all or a portion of the water-filled tube immediately above pinch rolls 11, thereby permitting greater selection of, and control over, the ratio of longitudinal to transverse stretching obtained, and reducing the amount of work required of belts 13 in lifting the water-filled tube.

Regardless of whether or not water bath 39 is employed, it is desirable to provide for a change of the water inside the stretched tube 19. This may be done intermittently, but is preferably done in a continuous manner, by introducing a small stream of water at the desired temperature through inlet 22, while withdrawing a like amount of water through tube 40, which dips nearly to the bottom of the water column within the stretched tube. Such circulation of water internally of the stretched tube helps to control the temperature of the polymeric body, by withdrawing the heat generated in the stretching zone, and, by virtue of such temperature control, assures greater uniformity in the final stretched product than is possible when the water contained within the tube is static and becomes heated by the film.

Reference has been made herein to the use of water, or other inert liquid, to effect stretching and crystallization of the polymeric tube. It should be evident at once that any inert liquid to be employed, other than water, should have a density of the same order of magnitude as that of water, so that, on the one hand, not too high a column of liquid is required to effect stretching, and on the other, that the column of liquid will reach above pinch rolls 11 a reasonable height to permit operation of belts 13 in the manner and for the purpose described. Preferred densities are in the range from 0.8 to 1.3, and such heavy liquids as acetylene tetrabromide or mercury should not be used. Water is itself the most suitable liquid, though glycols or mineral oils may be used.

The invention has been illustrated only with respect to the use of endless belts as the opposed lifting means employed in the claimed method. Figs. 4 and 5 illustrate two forms of rollers for use with such belts. It is not intended that the invention be limited to the described means, however, and, purely by way of illustration, it is to be understood that the stretched, water-filled tube may be lifted by means of rollers, if these are operated so as not to pinch the tube laterally in the undesirable manner which has been common heretofore. It should be clear also that deformed tubes having an elongated cross-section of dumb-bell shape, similar to that illustrated in Fig. 5, may be produced when using cylindrical rollers of the type shown in Fig. 4. In such case, the lifting means, whether belts or rollers, should preferably cover at least 80 per cent of the film area, or they may be pressed closely together, to provide the traction needed to lift the water-filled tube.

We claim:

1. The method which comprises continuously supplying a tube of normally crystalline vinylidene chloride polymer in the supercooled condition, constricting the tube to close the same, moving the tube vertically upward through and away from the constricting means, filling the tube above the constricting means with a sufficient amount of inert liquid having a density between 0.8 and 1.3 to effect radial distention of the tube, compressing without closing the upper portion of the liquid-filled tube, giving it an elongated cross-section, while lifting the open tube solely by means of a spaced pair of opposed endless belts, both moving at the same linear rate greater than the rate of supply of the supercooled tube, to stretch the tube longitudinally, slitting the tube longitudinally as it emerges from the lifting means, spreading the slit tube to form a flat sheet, all without again closing the tube, and collecting the so-formed wrinkle-free film.

2. The method which comprises continuously supplying a tube of normally crystalline vinylidene chloride polymer in the supercooled condition, constricting the tube to close the same, moving the tube vertically upward through and away from the constricting means, filling the tube with sufficient water to effect radial distention of the tube, compressing without closing the upper portion of the water-filled tube, giving it an elongated cross-section, while lifting the open tube solely by means of a spaced pair of opposed endless belts, both moving at the same linear rate greater than the rate of supply of the supercooled tube, to stretch the tube longitudinally, slitting the tube longitudinally as it emerges from the lifting means, spreading the slit tube to form a flat sheet, all without again closing the tube, and collecting the so-formed wrinkle-free film.

3. The method which comprises continuously supplying a tube of normally crystalline vinylidene chloride polymer in the supercooled condition, constricting the tube to close the same, moving the tube vertically upward through and away from the constricting means, filling the tube with sufficient water to effect radial distention of the tube, continuously changing the water within the tube by circulation therein of water admitted at and withdrawn from the upper and open end of the tube, compressing the upper portion of the water-filled tube, giving it an elongated cross-section, while lifting the open tube solely by means of a spaced pair of opposed endless belts, both moving at the same linear rate greater than the rate of supply of the supercooled tube, to stretch the tube longitudinally, slitting the tube longitudinally as it emerges from the lifting means, spreading the slit tube to form a flat sheet, all without again closing the tube, and collecting the so-formed wrinkle-free film.

4. The method which comprises continuously supplying a tube of normally crystalline vinylidene chloride polymer in the supercooled condition, constricting the tube to close the same, moving the tube vertically upward through and away from the constricting means, filling the tube with sufficient water to effect radial distention of the tube, surrounding the lower portion of the water-filled tube with a constant temperature water bath at a temperature above that at which the tube was supercooled, compressing without closing the upper portion of the water filled tube, giving it an elongated cross-section, while lifting the open tube solely by means of a spaced pair of opposed endless belts, both moving at the same linear rate greater than the rate of supply of the supercooled tube, to stretch the tube longitudinally, slitting the tube longitudinally as it emerges from the lifting means, spreading the slit tube to form a flat sheet, all without again closing the tube, and collecting the so-formed wrinkle-free film.

5. The method which comprises continuously supplying a tube of normally crystalline vinylidene chlorine polymer in the supercooled condition, constricting the tube to close the same, moving the tube vertically upward through and away from the constricting means, filling the tube with sufficient water to effect radial distention of the tube, continuously changing the water within the tube by circulation therein of water admitted at and withdrawn from the upper and open end of the tube, while surrounding the lower portion of the water-filled tube with a constant temperature water bath at a temperature above that at which the tube was supercooled, compressing the upper portion of the water-filled tube, giving it an elongated cross-section, while lifting the open tube solely by means of a spaced pair of opposed endless belts both moving at the same linear rate greater than the rate of supply of the supercooled tube, to stretch the tube longitudinally, slitting the tube longitudinally as it emerges from the lifting means, spreading the slit tube to form a flat sheet, all without again closing the tube, and collecting the so-formed wrinkle-free film.

6. The method as claimed in claim 2 wherein the tube is distended radially to about 3 times its diameter in the supercooled form and is stretched longitudinally to about 3 times its supercooled length per unit weight.

7. The method as claimed in claim 1, wherein the polymer employed is a crystalline copolymer of vinylidene chloride and vinyl chloride.

8. The method which comprises continuously supplying a tube of normally crystalline vinylidene chloride polymer in the supercooled condition, constricting the tube to close the same, moving the tube vertically upward through and away from the constricting means, filling the tube above the constricting means with a sufficient amount of inert liquid having a density between 0.8 and 1.3 to effect radical distention of the tube, compressing without closing the upper portion of the liquid-filled tube, giving it an elongated cross-section, while lifting the open tube solely by means of a pair of opposed pressure means, both acting at the same linear rate greater than the rate of supply of the supercooled tube, to stretch the tube longitudinally, slitting the tube longitudinally as it emerges from the lifting means, spreading the slit tube to form a flat sheet, all without again closing the tube, and collecting the so-formed wrinkle-free film.

9. The method which comprises continuously supplying a tube of normally crystalline vinylidene chloride polymer in the supercooled condition, constricting the tube to close the same, moving the tube vertically upward through and away from the constricting means, filling the tube above the constricting means with a sufficient amount of inert liquid having a density between 0.8 and 1.3 to effect radial distention of the tube, compressing without closing the upper portion of the liquid-filled tube, giving it an elongated cross-section, while lifting the open tube solely by means of a pair of opposed pressure means, both acting at the same linear rate greater than the rate of supply of the supercooled tube, to stretch the tube longitudinally, slitting the tube longitudinally as it emerges from the lifting means, spreading the slit tube over a perforate spreader board, blowing air against the film through said spreader board to cause the film to billow out into a flat sheet, all without against closing the tube, and collecting the so-formed wrinkle-free film.

CARROLL R. IRONS.
CHARLES E. SANFORD.

REFERENCES CITED

The following references are of record in the file of this patent:

UNITED STATES PATENTS

| Number | Name | Date |
|---|---|---|
| 2,267,488 | Becker | Dec. 23, 1941 |
| 2,358,376 | Banigan et al. | Sept. 19, 1944 |
| 2,361,369 | Grebe et al. | Oct. 31, 1944 |

FOREIGN PATENTS

| Number | Country | Date |
|---|---|---|
| 524,777 | Great Britain | Aug. 14, 1940 |